United States Patent Office 3,476,642
Patented Nov. 4, 1969

3,476,642
RUBBER TIRE REINFORCEMENT COMPOSITIONS, STRUCTURES AND METHODS
Gerhard Berg, Harald Blumel, and Manfred Glathe, Marl, Germany, assignors to Chemische-Werke Huls A.G., Marl, Germany
No Drawing. Continuation-in-part of application Ser. No. 452,341, Apr. 30, 1965. This application May 6, 1966, Ser. No. 548,042
Claims priority, application Germany, May 7, 1965, C 35,784, C 35,785, C 35,786
Int. Cl. B32b 27/32, 27/04, 32/08
U.S. Cl. 161—227             20 Claims

ABSTRACT OF THE DISCLOSURE

For increasing bond strength between tire cord and polyolefin rubbers, the tire cord is impregnated with an aqueous emulsion comprising: (a) an elastomeric, olefinic terpolymer, e.g. unsaturated ethylene-propylene copolymers; (b) homopolymers of vinyl pyridine or alkyl substituted vinyl pyridine; and (c) a heat convertible polyhydric phenol aldehyde resol, it being preferred that (a) has an unsaturation of 2.5–20 carbon to carbon double bonds per thousand carbon atoms and a Mooney viscosity ML–4 at 100° of about 40–150.

---

This invention is a continuation-in-part of application Ser. No. 452,341, filed Apr. 30, 1965, now abandoned.

The present invention relates generally to compositions and methods for bonding tire reinforcement to rubber and the improved structures obtained thereby, and is particularly related to the bonding of tire cord to elastomeric copolymerizates of ethylene with α-monoolefins.

In the manufacture of automobile tires, reinforcing materials, including cord and fabric made therefrom, are incorporated in the tire structure to improve the properties thereof. This reinforcing cord may be a natural textile such as cotton, a cellulosic material such as rayon, a polyamide reaction product as, for example, nylon, or a polyester product such as Dacron.

In bonding the reinforcement cord to the rubber, so-called adhesive media used are usually latex systems together with elastomer mixtures with which the textile fabrics are impregnated before they are processed. An adhesive medium widely used in the tire industry is a resorcinol-formaldehyde-resin-containing latex. This resin-latex mixture is obtained by condensing resorcinol with formaldehyde under alkaline conditions followed by combining the thus-produced aqueous solution of the resin-containing condensation products with a rubber latex. The condensation can take place in the rubber-latex. Suitable latices are natural ruber latex and synthetic rubber latices, for example, emulsion copolymerizates of butadiene and styrene.

Further, it is known that the rubber-textile bond can be improved by using elastomers having a polar group. For this reason, the tire industry has used as the latex component in the resorcinol-formaldehyde-resin latex mixture, a butadiene-styrene-vinyl-pyridine emulsion copolymerizate. The vinyl pryidine is incorporated into the polymerizate chain as the carrier of the polar group as disclosed in U.S. Patent 2,817,616, of William O. Wolfe, entitled "Bonded Composite Composition Structure Containing Ozone Resistant Tripolymer Rubber Composition and Adhesive," the disclosure of which is incorporated herein. The resin-latex composition of U.S. Patent 2,817,616 is eminently suited for cord impregnation, if the rubber mixture contains natural rubber or synthetic rubber, for example, polyisoprene, polybutadiene, or butadiene-styrene copolymerizates. The expression "rubber mixture" shall mean in this disclosure a mixture composed of rubbery hydrocarbons; fillers, for example, carbon blacks; plasticizers, for example, mineral oils; metallic oxides, for example, zinc oxide; organic acids, for example, stearic acid; vulcanizing agents, for example, sulfur; vulcanization accelerators, for example, tetramethylthiuram monosulfide, and other mixture components customary in the rubber processing technique. The expression "rubber," for example, in the term "rubber-textile bond," shall be a mixture as defined in the foregoing, i.e., a vulcanized rubber mixture.

In contradistinction thereto, the resin-latex composition of U.S. Patent 2,817,616 cannot be used when the rubber mixture comprises saturated or unsaturated elastomeric copolymerizates of ethylene with α-monoolefins since the adhesive bond is completely inadequate. α-Monoolefins may be any olefins having a —CH=CH$_2$ group containing from 3 to 6 carbon atoms such as propylene, butene-1, pentene-1, hexene-1, and 3,3-dimethyl propylene-1. An example of a particular rubber mixture is the unsaturated ethylene/propylene rubber prepared by the method disclosed in British Patent 962,250. Because of the differing vulcanization rate of the ethylene/propylene rubber as disclosed in British Patent 962,250 and the vulcanization rate of the rubber composition disclosed in U.S. Patent 2,817,616, the reason for the inadequate bonding is partially explained.

As a result, the impregnation of cord fibers for vulcanization into rubber mixtures comprising copolymerizates of ethylene with α-monoolefins and poly-unsaturated olefins is facilitated by contacting the impregnation with adhesive media whose elastomer component likewise comprises unsaturated copolymerizates of ethylene with α-monoolefins. When an unsaturated ethylene/propylene copolymerizate is used in the resorcinol-formaldehyde-resin-containing latex, the adhesive media which results gives poor adhesion. As a result, the polarity of this copolymerizate must be increased. Direct copolymerization of vinyl pyridine with ethylene and α-monoolefins cannot take place since the vinyl pyridine reacts, under the special conditions of the Ziegler synthesis of ethylene/α-monoolefn copolymerizates, with the catalysts and thus prevents the polymerization process.

Up to now it has been impossible to graft vinyl pyridine onto unsaturated ethylene/α-monoolefin copolymerizates since the copolymerizate contains normally only very few double bonds which must be held in reserve for the vulcanization process.

Having set forth the prior art and the problems faced thereby, the following objects of the present invention are set forth.

It is a general object of the present invention to improve the adhesion between textile reinforcement incorporated into vulcanized rubber products.

A particular object of the invention is the adhesive composition for impregnating the textile reinforcement material.

Another particular object of the invention is the method of incorporating the impregnated textile reinforcement material into a rubber product.

Still another particular object of the invention is the bonded composite structure comprising the textile reinforcement material embedded in a vulcanized rubber product.

A further particular object of the invention is the improved automobile tire construction comprising an ethylene/propylene rubber and a textile reinforcement material vulcanized therein.

Still further objects and the broad scope of the invention will become obvious from a reading of the specification, particular examples and claims which follow.

Having set forth the objects of the present invention, the various embodiments for carrying out these objects within the broad scope of the invention follow.

One aspect of this invention is to improve the adhesive strength of cord fibers, particularly of rayon or nylon, to rubber mixtures containing unsaturated elastomeric copolymerizates of ethylene with α-monoolefins and polyunsaturated olefins by impregnating the cords with phenol-formaldehyde-resin containing polymerizate dispersions, wherein the polymerizate dispersions are a mixture of a dispersion of copolymerizates of ethylene with α-monoolefins and polyunsaturated olefins, on the one hand, and an aqueous dispersion of homopolymerizates of vinyl pyridine or substituted vinyl pyridine on the other hand.

Any stage A phenolaldehyde resin may be used but it is preferred to use the water-soluble resorcinol formaldehyde resin. The resin is prepared by reacting equal molar amounts of a phenol with an aldehyde but it is preferred to use a molar excess of an aldehyde up to 2.5 mols per mol of a phenol in the presence of an alkaline catalyst until a water-soluble product is produced.

The resorcinol-formaldehyde resin is obtained by condensation of the components in an aqueous-alkaline solution. The weight ratio of resorcinol:formaldehyde can range between 10:1 and 1:1, and is preferably 11:6. The resin is employed in an amount of 2.5–50%, preferably 10–25%, based on the latex solid content. In this connection, all percentages disclosed are weight percentages.

According to one particular embodiment of the present invention, it has been found that the adhesion of reinforcing cord, preferably fibers of rayon or nylon, to elastomeric copolymers of ethylene with one or more α-monoolefins and one or more polyunsaturated olefins or rubber mixtures containing such copolymers is improved by impregnation with dispersions of mixtures of polymers containing phenol-formaldehyde where the mixtures contain first an aqueous dispersion of a copolymer of ethylene with one or more α-monoolefins and one or more polyunsaturated olefins, said copolymer having a Mooney viscosity ML–4 of 40 to 150, preferably 60 to 120, and secondly an aqueous dispersion of homopolymers of possibly substituted vinyl pyridine.

According to another particular embodiment of the present invention, it has been found that the adhesion of reinforcing cord, preferably fibers of rayon or nylon, to elastomeric copolymers of ethylene with one or more α-monoolefins and one or more polyunsaturated olefins or rubber mixtures containing such copolymers is improved by impregnation with dispersions of mixtures of polymers containing phenol-formaldehyde where the mixtures contain first an aqueous dispersion of a copolymer of ethylene with one or more α-monoolefins and one or more polyunsaturated olefins, said copolymer having 2.5 to 20 C=C double bonds per 1000 carbon atoms, preferably 6 to 15 C=C double bonds per 1000 carbon atoms, and secondly an aqueous dispersion of homopolymers of possibly substituted vinyl pyridine.

In still another particular embodiment according to the present invention, it has been found that the adhesion of reinforcing cord, preferably fibers of rayon or nylon, to elastomeric copolymers of ethylene with one or more α-monoolefins and one or more polyunsaturated olefins or rubber mixtures containing such copolymers is improved by impregnation with dispersions of mixtures of polymers containing phenol-formaldehyde where the mixtures contain first an aqueous dispersion of a copolymer of ethylene with one or more α-monoolefins and one or more polyunsaturated olefins, said copolymer having a Mooney viscosity ML–4 of 40 to 150, preferably 60 to 120, and said copolymer also having 2.5 to 20 C=C double bonds per 1000 carbon atoms preferably 6 to 15 C=C double bonds per 1000 carbon atoms, and secondly an aqueous dispersion of homopolymers of possibly substituted vinyl pyridine.

The α-monoolefins are olefins having a —CH=CH$_2$ group containing from 3 to 6 carbon atoms and the polyunsaturated olefins are olefins with two or more C=C double bonds and 3 to 20 carbon atoms.

Dispersions suitable for this process are dispersions of copolymerizates of ethylene or propylene with one or several α-monoolefins and polyunsaturated olefins, such as, for example, α-butylene, α-pentene, hexadiene-1,5, hexadiene-1,4, norborneene, 5-methylenenorborneene, dicyclopentadiene, cyclooctadiene, methylcyclooctadiene, 2,2,1-dicyclopentadiene, and 1,4,9-decatriene. Compounds having vinyl groups in the molecule, such as, for example, 1,2,4-trivinylcyclohexane, are also suitable as the olefin-component. In order to attain optimum adhesive strengths, it is preferred to employ dicyclopentadiene or hexadiene-1,4.

The copolymerization is conducted in a conventional manner with Ziegler-type catalysts. Particularly suitable catalysts are mixed catalysts of organometallic compounds of Groups I to II of Mendeleev's Periodic Table, on the one hand, and compounds of the metals of Subgroups IV to VI, as well as VIII of the Periodic Table, on the other hand. Particularly suitable are mixed catalysts of organoaluminum compounds and vanadium compounds. Preferred organoaluminum compounds are, for example, diethyl aluminum chloride, preferably ethyl aluminum sesquichloride. Vanadium compounds which can be used are, for example, vanadium tetrachloride, vanadium triacetylacetonate and preferably vanadium oxychloride.

The copolymerization is conducted in an inert organic solvent, for example, hexane, heptane, or benzene.

Particular examples of dispersions useful in the present invention having 2.5 to 20 C=C double bonds per 1000 carbon atoms are terpolymers of:

Ethylene - propylene - dicyclopentadiene containing 8 C=C double bonds per 1000 carbon atoms prepared as disclosed in U.S. Patent 3,000,866, Example 1.

Ethylene - propylene - hexadiene - 1,4 containing 3.1 C=C double bonds per 1000 carbon atoms prepared as disclosed in U.S. Patent 3,166,517, Example 2, and Ethylene - propylene - dicyclopentadiene containing 3.5 C=C double bonds per 1000 carbon atoms prepared as disclosed in U.S. Patent 3,000,866, Example 1.

Particular examples of dispersions useful in the present invention having a Mooney viscosity ML–4 of 40 to 150 are terpolymers of:

Ethylene - propylene - hexadiene-1,4 having a Mooney viscosity ML–4=55 prepared as disclosed in U.S. Patent 3,166,517, Example 2; the specific Mooney viscosity depending, e.g. on the polymerization temperature and Ethylene - propylene - dicyclopentadiene having a Mooney viscosity ML–4=85 prepared as disclosed in U.S. Patent 3,000,866, Example 1; the specific Mooney viscosity depending, e.g. on the polymerization temperature.

Particular examples of dispersions useful in the present invention having a Mooney viscosity ML–4 of 40 to 150 and 2.5 to 20 C=C double bonds per 1000 carbon atoms are terpolymers of:

Ethylene - propylene - hexadiene - 1,4 containing 3.1 C=C double bonds per 1000 carbon atoms and having a Mooney viscosity ML–4=55 prepared as disclosed in U.S. Patent 3,166,517, Example 2; the specific Mooney viscosity depending, e.g. on the polymerization temperature and Vinyl pyridine is homopolymerized according to various conventional methods. In addition to unsubstituted vinyl pyridine, likewise suitable are the alkyl substituted derivatives thereof, such as, for example, 2-methyl-5-vinyl pyridine and the substituted derivatives disclosed in U.S. Patent 2,817,616.

Thus, solution polymerization in benzene is preferred when the dispersion mixture used for impregnating the cord is to be produced from the benzenic solution of both polymer components. Suitable activators for this purpose are all the peroxides or hydroperoxides soluble in benzene whose decomposition temperatures lie below 80° C., as well as all benzene-soluble compounds which trigger a radical polymerization, for example, azodiisobutyric acid dinitrile.

If the dispersion mixture for impregnating the cord is to be produced by mixing the aqueous dispersions of both polymer components, the vinyl pyridine must be produced by emulsion polymerization. For this purpose, the vinyl pyridine is dispersed in water in the presence of anion-active and/or nonionic emulsifiers and is polymerized after the catalyst has been added. The Redox system comprising a mixture of 75% tert.-butyl hydroperoxide and 25% di-tert.-butyl peroxide ("Trigonox A 75") and tetraethylenepentamine is particularly well suited for this purpose. When this combination is used, the polymerization is terminated, at 20° C. in 5 hours. However, it is also possible to use all other conventional activators or activator systems customary in emulsion polymerization processes.

The dispersion mixtures employed herein can be produced by several processes.

In one preferred embodiment the benzenic solutions of the unsaturated ethylene-α-monoolefin copolymerizate and the polyvinyl pyridine are combined and dispersed in the emulsifier-containing water. By distilling off the benzene from the emulsion, a stable latex is obtained which can be used for the impregnation process. The stable latex is concentrated to the desired solid content after heating for several hours to 50–100° C. By using said polyvinyl pyridine emulsions the adhesion values are markedly increased.

In another preferred embodiment the unsaturated ethylene-α-monoolefin copolymerizate and polyvinyl pyridine dispersions are produced separately. The dispersions are then combined and used in this form for the impregnation process, after heating for several hours to 50–100° C. By using said polyvinyl pyridine dispersions the adhesion values are markedly increased.

The ratio of unsaturated ethylene-α-monoolefin copolymerizates to polyvinyl pyridine amounts to 99:0.1 to 60:40, preferably 95:5 to 80:20.

According to the first-named process, the benzenic solutions of both polymer components are combined and dispersed, with the aid of a dispersion device, for example, an agitator, a mill, a homogenizer, a mixer, or by an ultrasonic apparatus, in 0.2-times to 5-times, preferably 0.4 to 1.5-times the quantity of an aqueous emulsifier solution. Suitable emulsifiers are anion-active substances, preferably alkylaryl sulfonates, alkyl sulfonates, alkyl sulfates, as well as non-ionic substances, such as, for example, condensation products of phenols and alcohols with ethylene oxide. These surface-active substances can be employed by themselves or in combination with one another and/or with high molecular weight protecting colloids, such as polyvinyl alcohol, casein, glue, and cellulose derivatives. The amount of emulsifier is 0.1 to 1%, based on the polymerizate solution. The dispersion of the polymerizate solution is carried out in most cases at room temperature.

After the emulsification, the solvent introduced with the solution is removed by distillation at atmospheric or sub-atmospheric pressures. The latices obtained in this manner are stable. They can be concentrated by means of all conventional methods, such as, for example, by distilling off the water, adding creaming agents, or by centrifuging. The processes using creaming agents or a centrifuge are particularly recommended since large portions of the excess emulsifiers are removed thereby. In all processes, the temperature can be varied within wide limits.

According to the last-mentioned method, the dispersions of the polymer components are produced first and then employed as described above.

Thus, for example, a rayon cord fiber impregnated as prescribed by the invention, when using a rubber component consisting of an ethylene-propylene-dicyclopentadiene copolymerizate containing only C=C double bonds per 1000 carbon atoms, after having been vulcanized into a rubber mixture of an unsaturated ethylene-propylene copolymerizate, exhibits a static adhesion of 5.8 kg./2 cm. length of embedded material, and a dynamic adhesion of 100 minutes.

However, if, under otherwise identical test conditions, an ethylene-propylene-dicyclopentadiene copolymerizate is used having 8 C=C double bonds per 1000 carbon atoms, the static adhesion increases to 8.0 kg./2 cm. length of embedded material, and the dynamic adhesion increases by 100%, i.e. to 200 minutes.

Analogous improvements in values are obtained when cord fibers of nylon are employed.

According to a further illustration, a rayon tire cord fiber impregnated according to the invention, using a rubber component consisting of an ethylene-propylene-dicyclopentadiene copolymerizate with 3.5 C=C double bonds per 1000 carbons atoms, about 45% by weight of propylene, and a Mooney plasticity of 35, exhibits after drying and vulcanization into a rubber mixture a static adhesion of only 5.8 kg./2 cm. length of embedded material and a dynamic adhesion of 95 minutes.

The adhesion values are markedly increased when, under otherwise identical conditions, an ethylene-propylene-dicyclopentadiene copolymerizate of the same degree of unsaturation and the same content of propylene, but with a Mooney viscosity of 85, is employed. The static adhesion increases to 7.1 kg./2 cm. length of embedded material, and the dynamic adhesion increases to 150 minutes.

Analogous improvements in values are obtained when tire cord of nylon is employed.

The method of carrying out the Mooney viscosity measurements is disclosed in Kirk & Othmer, "Encyclopedia of Chemical Technology," vol. II, page 922, and the values set forth in this disclosure were measured at 100° C.

The conditions of impregnation, drying, final condensation and vulcanization are conventional. Such procedures are described in Markblatt No. 445 of Chemische Werke Hüls A.G., "Gewebeimprägnierung mit Bunatex VP," January 1962, and in Bayer, "Mitteilungen für die Industrie," vol. 29, page 73.

Without further elaboration, it is believed that one skilled in the art can, using the preceding description, utilize the present invention to its fullest extent. The following preferred specific embodiments are, therefore, to be construed as a merely illustrative, and not limitative of the disclosure in any way whatsoever.

EXAMPLE 1

(a) Production of the unsaturated ethylene-α-monoolefin copolymerizate latex.—10 kg. of a 5% solution of an ethylene-propylene-dicyclopentadiene terpolymer, containing 8 C=C double bonds per 1000 carbon atoms, in benzene, are dispersed in a dispersing device known commercially as an "Ultra-Turrax Mixer" at room temperature in 10 kg. of an aqueous emulsifier solution containing 70 g. tetrapropylene benzene sulfonate, 20 g. nonyl phenol triginta glycol ether, 10 g. of a naphthalenesulfonic acid-formaldehyde condensation product, and 2 kg. methanol. From the thus-obtained emulsion, the benzene is removed by distillation. The latex of about 7 to 8% is concentrated to 40 to 60% by centrifuging or by the addition of creaming agents. In this connection, all percentages given in the examples are weight percentages. The number of C=C double bonds per 1000 carbon atoms is determined by the chemical addition of iodine monochloride to the double bonds at 20° C. in carbon tetrachloride.

(b) Production of the polyvinyl pyridine dispersion.—200 g. of freshly distilled vinyl pyridine are dispersed for 10 minutes in 800 cc. water containing 4 g. tetrapropylene benzene sulfonate, and, after the addition of 4 g. "Trigonox A 75" (a mixture of 75% tert.butyl hydroperoxide and 25% di-tert.-butyl peroxide), for a period of another 2 minutes, in an "Ultra-Turrax-Mixer." The emulsion is mixed at 20° C. with 40 cc. of a 10% aqueous tetraethylenepentamine solution. The polymerization temperature is likewise 20° C. After 6 hours, the reaction is terminated. The latex has a solid content of 20%.

(c) Production of the impregnating latex (B) by mixing (a) with (b).—2000 g. of a 45% copolymerizate latex produced as described in (a) are combined with 500 g. of the 20% polyvinyl pyridine dispersion (b) with stirring. The solid content is 40%.

(d) Production of the resorcinol-formaldehyde-resin solution.—11 g. resorcinol are dissolved in 195 g. distilled water and there are added with stirring 20 g. 30% formaldehyde solution, as well as 40 g. of a 1% sodium hydroxide solution. This mixture is allowed to mature about 16 hours in darkness at room temperature. The solution contains 6.4% resin solids. The molar ratio of resorcinol to formaldehyde is 1:2.

(e) Production of the impregnating mixture.—250 g. of the 40% impregnating latex (c) are diluted with 484 g. of distilled water and mixed with 266 g. resorcinol-formaldehyde-resin solution (d) with stirring. The mixture contains 11.74% total solid content; the ratio of resin to impregnating latex solid material is in this example 17:100.

(f) Composition the rubber embedding mixture.—In order to embed the impregnated cord fiber, a rubber mixture of the following composition is employed:

Substance: Parts by weight
(1) Oil-mixed unsaturated ethylene-propylene rubber [1] _____ 73.5
(2) Ethylene-propylene rubber [2] _____ 26.5
(3) HAF (high abrasion furnace) carbon black  15.0
(4) SRF carbon black _____ 20.0
(5) ZnO-RS _____ 3.0
(6) Tetramethyl thiuram monosulfide _____ 1.3
(7) Sulfur _____ 1.0

[1] Oil content: 37.5 parts per 100 parts of unsaturated ethylene-propylene rubber; dicyclopentadiene content per rubber K value: about 4%; C₃ content: about 45%; Mooney viscosity (ML–4) at 100° C.: about 45.
[2] C₃ content: about 45%; dicyclopentadiene content: about 4%; Mooney viscosity (ML–4) at 100° C.: about 45.

(g) Testing of the adhesive strength of the rubber-textile bonded bodies.—Cord fibers are passed under tension through the impregnating mixture (e) in an impregnating apparatus, as well as through a tube heated by high frequency wherein the fibers are dried. The fiber absorption is about 6% dry substance, based on the weight of the fiber.

The dried fibers are heated for 20 minutes at a temperature of 150° C. The thus-treated fibers are inserted, under a tension (stress) of 1 kg., in the embedding mixture (f) provided in a mold. The mold receives 24 fibers which are surrounded on both sides by 2 cm. broad strips of the embedding mixture (f). The pressure (compression) in the mold is about 20 kg./cm.² and is maintained constant by spring rings. The vulcanization process is conducted for one hour, at 160° C.

The test bodies for the static test of adhesive strength are produced by dividing the vulcanized bonded body strip. After the rubber pieces have been completely tempered at 80° C., the adhesive strength of the vulcanized cord fiber is determined by means of a tensile testing machine. Since the length of the vulcanized fiber is 20 mm., the adhesive strength is set forth in kg./20 mm. The disclosed values are median values determined from at least 6 individual tests.

The dynamic test is conducted at 80° C., in a suitable apparatus (see, for example, Bayer, "Mitteilungen füer die Gummi-Industrie" [News for the Rubber Industry] No. 29, p. 73). The time is determined in minutes, necessary after a varying application of stress to dislodge the vulcanized cord fiber from the embedding mixture. From at least 6 individual values, the medium value is determined.

Cord fibers employed in this connection are:
(1) S/S Rayon, Td. 1650/2, 480/480 ZS
(2) Nylon Td. 840/2, 480/480 ZS An impregnation latex passing through the test at the same time is provided, all other production conditions being equal, as the elastomer component, with an ethylene-propylene-dicyclopentadiene copolymerizate having only 2.0 C=C double bonds per 1000 carbon atoms as compared with 8 C=C double bonds per 1000 carbon atoms in case of impregnation latex (B). The ML–4 value is about 45.

TEST RESULTS—EXAMPLE 1

| Test No.: | Impregnating latex | Cord | Static test, kg./2 cm. | Dynamic test in minutes |
|---|---|---|---|---|
| 1 | A | Rayon | 5.8 | 100 |
| 2 | B | do | 7.9 | 205 |
| 3 | A | Nylon | 4.9 | 110 |
| 4 | B | do | 7.7 | 205 |

EXAMPLE 2

(a) Production of the unsaturated ethylene-α-monoolefin copolymerizate latex.—10 kg. of a 5% solution of an ethylene-propylene-hexadiene-1,4-copolymerizate containing 3.1 C=C double bonds per 1000 carbon atoms, Mooney viscosity MI–4=55, in benzene are dispersed, in a dispersing apparatus known commercially as "Ultra-Turrax Mixer," at room temperature, in 10 kg. of an aqueous emulsifier solution containing 70 g. tetrapropylene benzene sulfonate, 20 g. nonyl phenol triginta glycol ether, 10 g. of a naphthalene-sulfonic acid-formaldehyde condensation product, and 2 kg. methanol. From the thus-obtained emulsion, the benzene is removed by distillation. The latex of about 7 to 8% is concentrated to 40–60% by creaming or centrifuging.

(b) Production of the polyvinyl pyridine dispersion.—200 g. freshly distilled vinyl pyridine are dispersed for 10 minutes in 1.33 kg. water containing 4 g. tetrapropylene benzene sulfonate, and for an additional period of 2 minutes after the addition of 4 g. "Trigonox A 75" (a mixture of 75% tert.-butyl hydroperoxide and 25% di-tert.-butyl peroxide), this being done in an "Ultra-Turrax-Mixer." The emulsion is mixed at 20° C. with 40 cc. of a 10% aqueous tetraethylenepentamine solution. The polymerization temperature likewise is 20° C. After 6 hours, the reaction is terminated. The latex has a solid content of 15%.

(c) Production of the impregnation latex (D) by mixing (a) with (b).—1830 g. of a 49% copolymerizate latex produced as disclosed in 2(a) are combined, with 670 g. of the 15% polyvinyl pyridine dispersion 2(b) with stirring. The solid content is 40%.

(d) Production of the resorcinol-formaldehyde-resin solution.—11 g. resorcinol are dissolved in 195 g. of distilled water and there are added under stirring 20 g. 30% formaldehyde solution, as well as 40 g. of a 1% sodium hydroxide solution. This mixture is allowed to mature for about 16 hours in darkness at room temperature. The solution contains 6.4% resin solids. The molar ratio of resorcinol:formaldehyde is 1:2.

(e) Production of the impregnating mixture.—250 g. of the 40% impregnation latex (c) are diluted with 484 g. of distilled water and mixed with 266 g. resorcinol-formaldehyde-resin solution (d) with stirring. The mixture contains 11.74% of total solid content; the ratio of resin:impregnation latex solid material is, in this example, 17:100.

(f) Composition of the rubber embedding mixture.—For embedding the impregnated cord fiber, there is employed a rubber mixture of the following composition:

| Substance: | Parts by weight |
|---|---|
| (1) Oil-mixed unsaturated ethylene-propylene rubber[1] | 73.5 |
| (2) Ethylene-propylene rubber[2] | 26.5 |
| (3) HAF carbon black | 15.0 |
| (4) SRF carbon black | 20.0 |
| (5) ZnO RS | 3.0 |
| (6) Tetramethyl thiuram monosulfide | 1.3 |
| (7) Sulfur | 1.0 |

[1] Oil content: 37.5 parts per 100 parts of unsaturated ethylene-propylene rubber; dicyclopentadiene content per rubber K value: about 4%; $C_3$ content: about 45%; Mooney viscosity (ML–4) at 100° C.: about 45.
[2] $C_3$ content: about 45%; dicyclopentadiene content: about 4%; Mooney viscosity (ML–4) at 100° C.: about 45.

(g) Testing the adhesive strength of the rubber-textile bonded bodies.—Cord fibers, in an impregnation apparatus, are passed under tension through the impregnating mixture (e), as well as through a tube heated by high frequency wherein the fibers are dried. The fiber absorption is about 6% dry substance, based on the weight of the fiber.

The dried fibers are heated for 20 minutes at 150° C. The thus-treated fibers are inserted, under a stress of 1 kg., in a mold containing the embedding mixture (f). The mold can receive 24 fibers which are surrounded on both sides by 2 cm. broad strips of the embedding mixture (f). The pressure in the mold is about 20 kg./cm.² and is kept constant by means of spring rings. The vulcanization process is carried out for one hour at 160° C.

The testing bodies for the static test of adhesive strength are produced by dividing the vulcanized bonded body strip. After completing the tempering of the rubber pieces at 80° C., the adhesive strength of the cord fiber vulcanized thereinto is determined by means of a tensile testing machine. Since the length of the vulcanized fiber is 20 mm., the adhesive strength is set forth in kg./20 mm. The listed values are median values determined from at least 6 individual tests.

The dynamic test is conducted in a suitable apparatus (see, for example, Bayer, Mitteilungen füer die Gummi-Industrie [News for the Rubber Industry], No. 29, p. 73), at 80° C. The time is determined, in minutes, required, after applying varying stresses, to dislodge the vulcanized cord fiber from the embedding mixture. From at least 6 individual values, the median value is determined.

Cord fibers employed in this test are:

(1) S/S rayon, Td. 1650/2, 480/480 ZS
(2) Nylon Td. 840/2, 480/480 ZS

In addition to the latex described in Example 2, an impregnating latex (C) is tested at the same time, having under otherwise identical production conditions, as the elastomeric component an ethylene-propylene-hexadiene-1,4 copolymerizate with only 1.5 C=C double bonds per 1000 carbon atoms—as compared to 3.1 C=C double bonds per 1000 carbon atoms in case of the impregnating latex (D). The ML–4 value is 55.

TEST RESULTS—EXAMPLE 2

| Test No.: | Impregnating latex | Cord | Static test, kg./2 cm. | Dynamic test in minutes |
|---|---|---|---|---|
| 1 | C | Rayon | 6.3 | 175 |
| 2 | D | do | 7.1 | 230 |
| 3 | C | Nylon | 6.1 | 150 |
| 4 | D | do | 7.2 | 240 |

EXAMPLE 3

(a) Production of the unsaturated ethylene-α-monoolefin copolymerizate latex.—10 kg. of a 5% benzenic solution of an ethylene-propylene-dicyclopentadiene copolymerizate having a Mooney viscosity ML–4=85, having 45% by weight of propylene and 3.5 C=C double bonds per 1000 carbon atoms, is dispersed in a dispersing apparatus known commercially as an "Ultra-Turrax-Mixer," at room temperature, in 10 kg. of an aqueous emulsifier solution containing 70 g. tetrapropylene benzene sulfonate, 20 g. nonyl phenol triginta glycol ether, 10 g. of a naphthalenesulfonic acid-formaldehyde condensation product, and 2 kg. methanol. From the thus-obtained emulsion, the benzene is removed by distillation. The latex of ca. 7 to 8% is concentrated by creaming or centrifuging to 40–60%.

The number of C=C double bonds per 1000 carbon atoms is determined by the chemical addition of iodine monochloride to the double bonds at 20° C. in carbon tetrachloride. Also, all percentages in the examples are weight percentages.

(b) Production of the polyvinyl pyridine dispersion.—200 g. freshly distilled vinyl pyridine is dispersed in an "Ultra-Turrax-Mixer" in 800 cc. of water containing 4 g. of tetrapropylene benzene sulfonate, for 10 minutes, and is additionally dispersed for 2 minutes after the addition of 4 g. "Trigonox A 75" (a mixture of 75% tert.-butyl hydroperoxide nad 25% di-tert.-butyl peroxide). The emulsion is mixed at 20° C. with 40 cc. of a 10% aqueous tetraethylenepentamine solution. The polymerization temperature is likewise 20° C. After 6 hours, the reaction is terminated. The latex has a solid content of 20%.

(c) Production of the impregnation latex (F) by mixing (a) with (b).—2000 g. of a copolymerizate latex of 45%, produced according to (a), is combined under stirring with 500 g. of the 20% polyvinyl pyridine dispersion (b). The solid content is 40%.

(d) Production of the resorcinol-formaldehyde-resin solution.—11 g. resorcinol are dissolved in 195 g. of distilled water, and there are added 20 g. 30% formaldehyde solution and 40 g. of a 1% sodium hydroxide solution, with stirring. This mixture is allowed to mature for about 16 hours in darkness at room temperature. The solution contains 6.4% resin solids. The molar ratio of resorcinol: formaldehyde is 1:2.

(e) Production of the impregnation mixture.—250 g. of the 40% impregnation latex (c) is diluted with 44 g. of distilled water and mixed with 266 g. resorcinol-formaldehyde-resin solution (d) with stirring. The mixture contains 11.74% total solid content; the ratio of resin to the impregnation latex solid is, in this example, 17 to 100.

(f) Composition of the rubber-embedded material mixture.—In order to embed the impregnated tire cord, a rubber mixture of the following composition is employed:

| Substance: | Parts by weight |
|---|---|
| (1) Oil-mixed unsaturated ethylene-propylene rubber[1] | 73.5 |
| (2) Ethylene-propylene rubber[2] | 26.5 |
| (3) HAF (high abrasion furnace) carbon black | 15.0 |
| (4) SRF carbon black | 20.0 |
| (5) ZnO-RS | 3.0 |
| (6) Tetramethyl thiurammonosulfide | 1.3 |
| (7) Sulfur | 1.0 |

[1] Oil content: 37.5 parts per 100 parts of unsaturated ethylene-propylene rubber; dicyclopentadiene content per rubber K value: about 4%; $C_3$ content: about 45%; Mooney viscosity (ML–4) at 100° C.: about 45.
[2] $C_3$ content: about 45%; dicyclopentadiene content: about 4%; Mooney viscosity (ML–4) at 100° C.: about 45.

(g) Testing the adhesive strength of the rubber-textile bonded bodies.—Threads of cord are run, in an impregnating apparatus, under tension, through the impregnation mixture (e), as well as through a tube heated by high frequency wherein the threads are dried. The absorption of the thread is about 6% of the dry substance, based on the weight of the thread.

The dried fibres are heated for 20 minutes at 150° C. The thus-treated fibres are inserted, under a tension of 1 kg., into a mold in the embedded material mixture (f). The mold can receive 24 fibres which are surrounded on both sides by 2 cm. broad strips of the embedding mixture (f). The pressure force in the mold is about 20 kg./cm.$^2$ and is maintained at a constant value by spring rings. The vulcanization process is conducted for 1 hour, at 160° C.

The test bodies for the static adhesion test are produced by dividing the vulcanized bonded strip. After the rubber pieces have been completely tempered at 80° C., the adhesive strength of the vulcanized cord fiber is determined by means of a tensile testing machine. Since the length of the vulcanized fiber is 20 mm., the adhesive strength is set forth in kg./20 mm. The disclosed values are median values of at least 6 individual tests.

The dynamic test is conducted in a suitable apparatus (see, for example, Bayer, Mitteilungen füer die Gummi-Industrie ["News for the Rubber Industry"], No. 29, p. 73), at 80° C. Determination is made of the time, in minutes, necessary after a varying load application, to detach the vulcanized cord fibre from the embedded mixture. From at least 6 individual values, the median value is determined.

Cord fibres employed in this connection are:

(1) S/S Rayon, Td. 1650/2, 480/480 ZS
(2) Nylon Td. 840/2, 480/480 ZS

An impregnated latex (E) is tested at the same time as the latex (F) described in Example 1 whose Mooney viscosity ML-4 is 85, contains, all other manufacturing conditions being equal, as the rubber component an ethylene-propylene-dicyclopentadiene copolymerizate having a Mooney viscosity 35, 3.5 C=C double bonds per 1000 carbon atoms, and about 45% by weight of propylene.

TEST RESULTS—EXAMPLE 3

|  | Impregnating latex | Cord | Static test, kg./2 cm. | Dynamic test in minutes |
|---|---|---|---|---|
| Test No.: |  |  |  |  |
| 1 | E | Rayon | 6.5 | 110 |
| 2 | F | do | 7.0 | 200 |
| 3 | E | Nylon | 6.0 | 115 |
| 4 | F | do | 6.8 | 195 |

EXAMPLE 4

(a) Production of the unsaturated ethylene-α-monoolefin copolymerizable solution.—600 g. of a 5% solution of a copolymerizate containing 45% ethylene, 52% propylene, and 3% dicyclopentadiene, and having a Mooney viscosity ML-4 of 45, are dissolved in 11.4 kg. benzene.

(b) Production of the polyvinyl pyridine solution.—150 g. vinyl pyridine are added with stirring to 450 g. of benzene. The polymerization is then carried out at 50° C. by the addition of 1.5 g. of azodiisobutyric acid dinitrile thereto. After the polymerization is terminated, the polymerizate is diluted with 2.4 kg. of benzene. There are obtained 3 kg. of a 5% polyvinyl pyridine solution of benzene.

(c) Formation of the impregnating latex from the combined solutions of (a) and (b).—12 kg. of the benzenic solution of the unsaturated ethylene-propylene copolymerizate obtained in (a) and 3 kg. of the benzenic polyvinyl pyridine solution (b) are combined while stirring. The resultant mixture is then dispersed in 15 kg. of an aqueous emulsifier solution containing 80 g. of tetrapropylene benzene sulfonate, 40 g. nonyl phenol triginta glycol ether, 30 g. of a naphthalene sulfonic acid formaldehyde condensation product, and 3 kg. of methanol at room temperature in an "Ultra Turrax Mixer." From the obtained emulsion, the benzene is removed by distillation. The latex of about 7% is concentrated to 40–60% by creaming.

(d) Production of the resorcinol-formaldehyde-resin solution.—11 g. resorcinol are dissolved in 195 g. of distilled water. While stirring, 20 g. 30% formaldehyde solution and 40 g. of a 1% sodium hydroxide solution are added thereto. The mixture is then allowed to stand for about 16 hours in darkness at room temperature. The solution contains 6.4% resin solid content. The molar ratio of resorcinol:formaldehyde is 1:2.

(e) Production of the impregnating mixture.—250 g. of the latex obtained in (c) are diluted with 484 g. of distilled water and mixed while stirring with 266 g. resorcinol-formaldehyde-resin solution (d). The mixture contains 11.74% total solid content. The ratio of resin:impregnation latex solid content is 17:100.

(f) Utilizing the rubber embedding mixture and test procedure of Example 1, a series of tests were made as shown below with various of the latex compositions prepared in accordance with this example.

TEST RESULTS—EXAMPLE 4

| Test No. | Latex-composition percent APUK+ | PVP++ | Cord | Static test, kg./2 cm. | Dynamic test in minutes |
|---|---|---|---|---|---|
| 1 | 100 | 0 | Rayon | 4.5 | 25 |
| 2 | 100 | 0 | do | 5.0 | 35 |
| 3 | 95 | 5 | do | 5.9 | 85 |
| 4 | 90 | 10 | do | 6.0 | 105 |
| 5 | 80 | 20 | do | 5.8 | 95 |
| 6 | 100 | 0 | Nylon | 3.5 | 30 |
| 7 | 90 | 10 | do | 5.5 | 90 |

+APUK=Unsaturated ethylene-propylene rubber (proportion of solids).
++PVP=Polyvinylpyridine (proportion of solids).

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the scope of the present invention.

What is claimed is:

1. A cord to rubber bond producing adhesive composition comprising an aqueous emulsified mixture of:
   (a) an elastomeric copolymer of ethylene, an α-monoolefin, having 3 to 6 carbon atoms and a poly-unsaturated olefin having 3 to 30 carbon atoms;
   (b) a homopolymer of a monomer selected from the group consisting of vinyl pyridine and alkyl-substituted vinyl pyridine wherein the weight ratio of the solids of (a) to (b) is about 99:0.1 to 60:40; and
   (c) about 2.5 to 50% of a heat convertible polyhydric phenolaldehyde resol based on the solid content of (a), (b) and (c).

2. The composition of claim 1, wherein (a) is a copolymer of ethylene, an α-monoolefin having 3 to 6 carbon atoms, and a polyunsaturated olefin having 3 to 30 carbon etoms, said copolymer having about 2.5 to 20 C=C double bonds, per 1000 carbon atoms.

3. The composition of claim 1, wherein (a) is a copolymer of ethylene, an α-monoolefin having 3 to 6 carbon atoms, and a polyunsaturated olefin having 3 to 30 carbon atoms, said copolymer having a Mooney viscosity ML-4 at 100° C. of about 40–150.

4. The composition of claim 1, wherein (a) is a copolymer of ethylene, an α-monoolefin having 3 to 6 carbon atoms and a polyunsaturated olefin having 3 to 30 carbon atoms, said copolymer having a Mooney viscosity ML-4 at 100° C. of about 40–150 and said copolymer also having about 2.5 to 20 C=C double bonds per 1000 carbon atoms.

5. The composition of claim 4, wherein said copolymer is a terpolymer of ethylene, propylene and dicyclopentadiene.

6. The composition of claim 4, wherein said copolymer is a terpolymer of ethylene, propylene and hexadiene-1,4.

7. The composition of claim 1, wherein the polyhydric phenolaldehyde resol of (c) is a condensation product of resorcinol and formaldehyde.

8. The composition of claim 1, wherein the weight ratio of the solids of (a) to (b) is about 95:5 to 80:20.

9. The composition of claim 1, wherein the resol content of (c) is about 10 to 25%.

10. The composition of claim 1, wherein the copolymer of (a) has a Mooney viscosity ML-4 at 100° C. of about 60–120.

11. The composition of claim 2, wherein the copolymer of (a) has about 6 to 15 C=C double bonds per 1000 carbon atoms.

12. The composition of claim 4, wherein the copolymer of (a) has a Mooney viscosity ML-4 at 100° C. of about 60–120 and about 6 to 15 C=C double bonds per 1000 carbon atoms.

13. A bonded composite structure comprising a reinforcing cord embedded in a vulcanized rubber of an olefin terpolymer and bonded thereto under the influence of heat by an adhesive composition comprising a mixture of:
 (a) an elastomeric copolymer of ethylene, an α-monoolefin, and a polyunsaturated olefin, said copolymer having a Mooney viscosity ML-4 at 100° C. of about 40–150;
 (b) a homopolymer of a monomer selected from the group consisting of vinyl pyridine and alkyl-substituted vinyl pyridine wherein the weight ratio of the solids of (a) to (b) is about 99:0.1 to 60:40; and
 (c) about 2.5 to 50% of a heat convertible polyhydric phenolaldehyde resol based on the solid content of (a), (b), and (c).

14. The bonded composite structure of claim 13 wherein (a) is a copolymer of ethylene, an α-monoolefin and a polyunsaturated olefin, said copolymer having about 2.5 to 20 C=C double bonds per 1000 carbon atoms.

15. The bonded composite structure of claim 13, wherein (a) is a copolymer of ethylene, an α-monoolefin, and a polyunsaturated olefin, said copolymer having a Mooney viscosity ML-4 at 100° C. of about 40–150 and said copolymer also having about 2.5 to 20 C=C double bonds per 1000 carbon atoms.

16. The tire cord of claim 20, wherein (a) is a copolymer of ethylene, an α-monoolefin of 3 to 6 carbon atoms and a polyunsaturated olefin of 3 to 20 carbon atoms, said copolymer having about 2.5 to 20 C=C double bonds per 1000 carbon atoms.

17. The tire cord of claim 20, wherein (a) is a copolymer of ethylene, an α-monoolefin of 3 to 6 carbon atoms and a polyunsaturated olefin of 3 to 20 carbon atoms, said copolymer having a Mooney viscosity ML-4 at 100° C. of about 40–150.

18. The tire cord of claim 20, wherein (a) is a copolymer of ethylene, an α-monoolefin of 3 to 6 carbon atoms and a polyunsaturated olefin of 3 to 20 carbon atoms, said copolymer having a Mooney viscosity ML-4 at 100° C. of about 40–150 and said copolymer also having about 2.5 to 20 C=C double bonds per 1000 carbon atoms.

19. The composition of claim 1 wherein said emulsified mixture is produced by mixing a solution of (a) in an inert organic solvent with a solution of (b) in said solvent, adding water to the resultant solution and emulsifying the same, distilling the resultant emulsion to remove the organic solvent, and mixing the resol of (c) therewith.

20. A tire cord impregnated with a composition comprising:
 (a) an elastomeric copolymer of ethylene, an α-monoolefin of 3 to 6 carbon atoms and a polyunsaturated olefin of 3 to 20 carbon atoms,
 (b) a homopolymer of a monomer selected from the group consisting of vinyl pyridine and alkyl-substituted vinyl pyridine wherein the weight ratio of the solids of (a) to (b) is about 99:0.1 to 60:40; and
 (c) about 2.5 to 50% of a heat convertible polyhydric phenolaldehyde resol based on the solid content of (a), (b) and (c).

References Cited
UNITED STATES PATENTS

| | | | |
|---|---|---|---|
| 3,262,482 | 7/1966 | Clifton et al. | 152—330 |
| 3,311,151 | 3/1967 | Willis et al. | 152—330 |
| 3,366,508 | 1/1968 | Gallagher | 260—29.3 XR |

FOREIGN PATENTS

| | | |
|---|---|---|
| 580,399 | 7/1959 | Canada. |

MURRAY TILLMAN, Primary Examiner

M. J. TULLY, Assistant Examiner

U.S. Cl. X.R.

156—331, 334; 161—231, 249; 260—29.3, 29.7, 33.6, 846, 848, 887, 895, 897

UNITED STATES PATENT OFFICE
CERTIFICATE OF CORRECTION

Patent No. 3,476,642              Dated November 4, 1969

Inventor(s) GERHARD BERG, HARALD BLUMEL, and MANFRED GLATHE

It is certified that error appears in the above-identified patent and that said Letters Patent are hereby corrected as shown below:

Column 4, Line 67, after "temperature and" insert this paragraph:

---ethylene-propylene-dicyclopentadiene containing 3.5 C = C double bonds per 1000 carbon atoms and having a Mooney viscosity ML-4 = 85 prepared as disclosed in U.S. Patent 3000 866, Example 1; the specific Mooney Viscosity depending, e.g., on the polymerization temperature.---

Column 4, Line 20, change "Groups I to II" to ---Groups I to III---

Signed and sealed this 27th day of April 1971.

(SEAL)
Attest:

EDWARD M. FLETCHER, JR.  
Attesting Officer

WILLIAM E. SCHUYLER, JR.  
Commissioner of Patents